United States Patent [19]
Rea

[11] 4,144,951
[45] Mar. 20, 1979

[54] WHEEL CHOCK
[76] Inventor: Levoy B. Rea, 2209 Lawnmont, No. 106, Austin, Tex. 78756
[21] Appl. No.: 867,903
[22] Filed: Jan. 9, 1978
[51] Int. Cl.² .............................................. B60T 3/00
[52] U.S. Cl. ................................................... 188/32
[58] Field of Search .................................. 188/4 R, 32
[56] References Cited
U.S. PATENT DOCUMENTS

| | | | |
|---|---|---|---|
| 2,858,906 | 11/1958 | Minick | 188/32 |
| 3,347,343 | 10/1967 | Lockhart | 188/32 |
| 3,902,574 | 9/1975 | Wright | 188/4 R |

Primary Examiner—Duane A. Reger
Attorney, Agent, or Firm—John C. Stahl

[57] ABSTRACT

A wheel chock comprising a molded body and a stabilizer bar principally housed in said body in retracted condition; said bar adapted to be extended whereby the weight of a vehicle resting on said bar holds said body firmly in place against a tire and restrains movement thereof.

8 Claims, 9 Drawing Figures

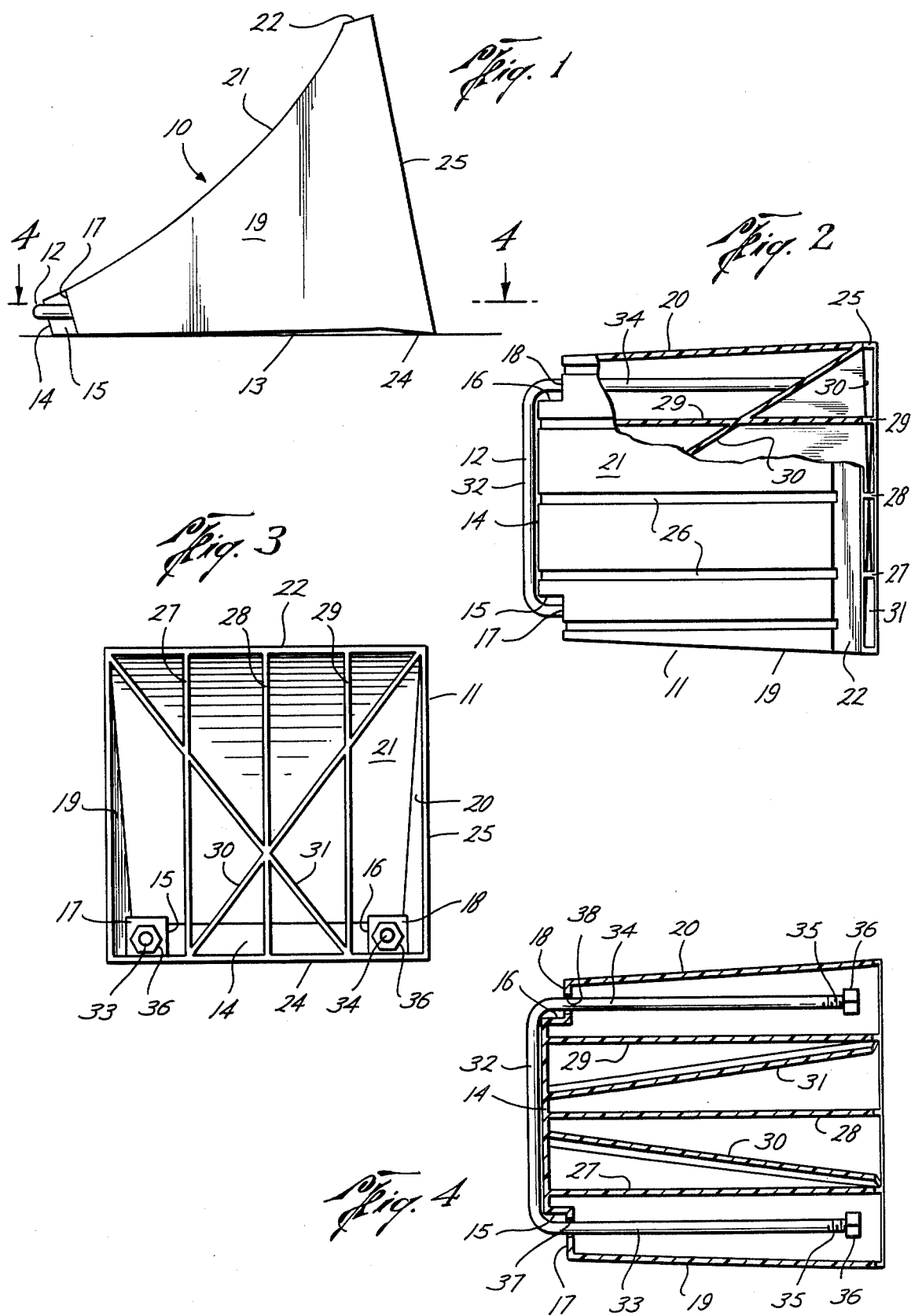

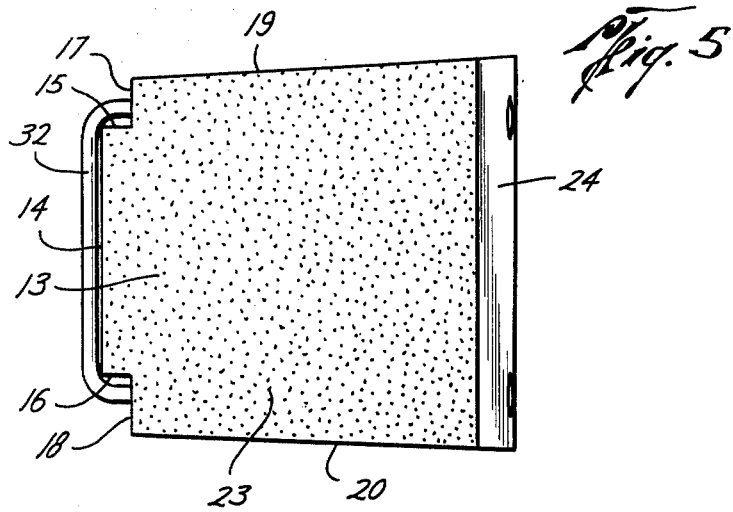
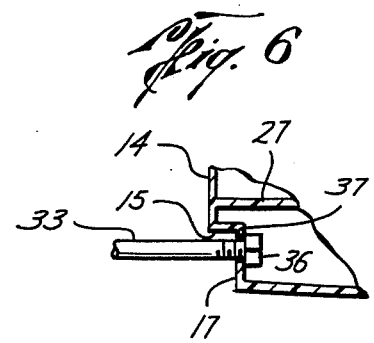
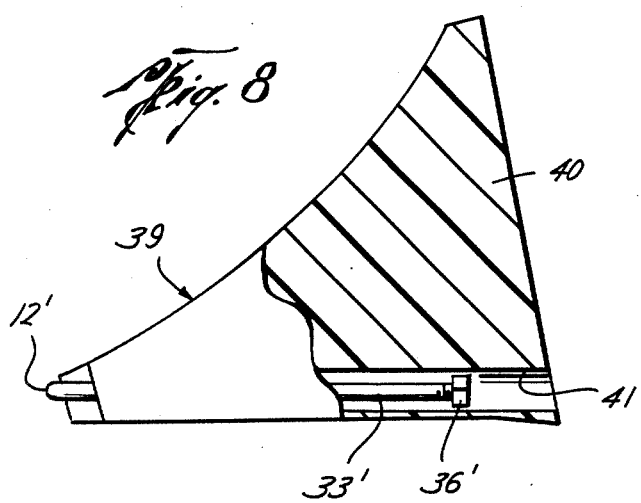
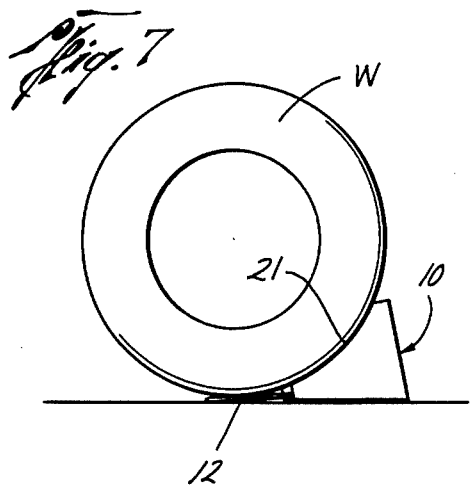
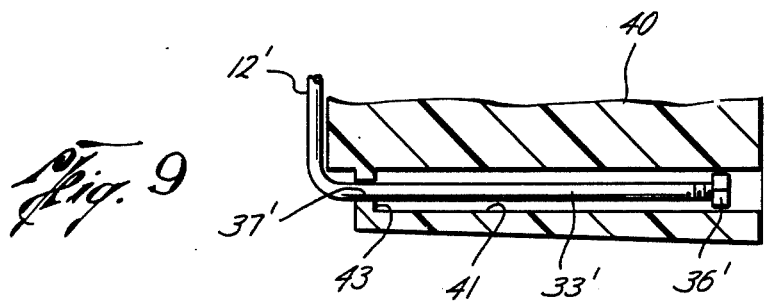

WHEEL CHOCK

BACKGROUND OF THE INVENTION

It is well known that one or more wheels of a passenger vehicle, truck or trailer should be chocked or otherwise secured when tires are changed, during repair operations when the vehicle is lifted, or when parking the vehicle on a relatively steep slope when the brakes cannot be depended upon to hold said vehicle against rolling. In general, many of these chocks or blocking devices rely upon a wedging action against the tire to prevent movement; during loading and unloading operations, however, there may be substantial movement of such type devices and they may work loose. Furthermore, these prior art blocking devices are often relatively heavy, have large storage requirements, and are generally of metallic or wooden composition.

SUMMARY OF THE INVENTION

The principal object of the invention is the provision of a lightweight chock which restrains movement of a vehicle without damage to the tires thereof.

Another object is to provide such a chock which does not rely solely upon a wedging action against the tire to prevent movement thereof.

Still another object is to provide such a chock which is universal in its adaptability, easy to use, relatively inexpensive to manufacture, and capable of mass production techniques.

Other objects and features of the invention will become apparent to those skilled in the art from a consideration of the foregoing specification when read in the light of the annexed drawings.

BRIEF DESCRIPTION OF THE DRAWINGS

FIG. 1 is a side elevational view of a preferred embodiment of wheel chock of the subject invention.

FIG. 2 is a top plan view, partly broken away and partly in section, of FIG. 1.

FIG. 3 is a rear elevational view of FIG. 1.

FIG. 4 is a horizontal sectional view, taken on the line 4—4 of FIG. 3, looking in the direction of the arrows.

FIG. 5 is a bottom plan view of FIG. 1.

FIG. 6 is a fragmentary, horizontal sectional view through the lateral portion of the body showing the stabilizer bar in extended condition.

FIG. 7 is a diagrammatic view showing the wheel chock in operative condition.

FIG. 8 is a side elevational view, partly broken away and partly in section, of another embodiment of wheel chock of the subject invention.

FIG. 9 is a fragmentary, horizontal sectional view through the lateral portion of the embodiment of FIG. 8.

DESCRIPTION OF PREFERRED EMBODIMENTS

Referring now to the drawings, wherein like reference numerals designate like or corresponding parts throughout the several views, there is shown in FIGS. 1-7 a preferred embodiment of wheel chock 10 consisting of body 11 and stabilizer bar 12 retractably mounted therein. Body 11, molded of polypropylene or reinforced plastic composition and preferably of relatively thin wall sections, comprises base 13, face 14, minor sides 15-16, secondary faces 17-18, major sides 19-20, wheel-engaging surface 21 and inclined surface 22. Base 13 is relatively flat and desirably includes a regular or irregular pattern or design 23 on selected portions of the lower surface adapted to frictionally engage a supporting surface, said base terminates rearwardly in a transversely extending and downwardly depending wedge 24 or the like adapted to project into a relatively soft supporting surface. Body 11 terminates forwardly and medially in rectangularly shaped, transversely extending, forwardly inclined face 14 of substantially lesser width than the overall width of said body; each end of said face joins the adjacent end of quadrilaterally shaped, vertically extending and rearwardly diverging sides 15,16. Quadrilaterally shaped, forwardly inclined faces 17,18 are transversely aligned and join the adjacent ends of sides 15-16 and sides 19-20, respectively. Wheel-engaging surface 21, generally concave, is integral with the adjacent ends of face 14, sides 15-16, faces 17-18, and sides 19-20, respectively, and terminates upwardly in transversely extending and angularly inclined surface 22. Sides 19,20 are essentially vertical and diverge rearwardly, terminating in declining edge 25 which aligns with the rearmost edge of surface 22 and wedge 24, respectively. Desirably a plurality of longitudinally extending and laterally spaced grooves 26 or other means are provided on wheel-engaging surface 21 to restrain lateral movement of a wheel supported thereon.

As best seen in FIGS. 3 and 4 of the drawings, a plurality of internal, longitudinally extending braces 27-29 and angularly inclined braces 30-31 are provided; specifically, vertically extending, laterally spaced braces 27-29 join base 13, face 14, wheel-engaging surface 21 and inclined surface 22. Brace 30, integral with base 13, extends from the interior angle formed between base 13 and brace 27 and terminates forwardly in face 14 in proximity to the medial, longitudinal axis of the body (see FIG. 4); said brace extends, angularly upwardly, joins brace 28 below the center point thereof, joins brace 29 above the center point thereof, terminates in the interior angle formed between side 20 and inclined surface 22, and is integral with wheel-engaging surface 21.

In like manner, brace 31, integral with base 13, extends from the interior angle formed between base 13 and brace 29 and terminates forwardly in face 14 in proximity to the medial, longitudinal axis of the body. Brace 31 extends angularly upwardly to join the junction of braces 28 and 30, joins brace 27 above the center point thereof, terminates in the interior angle formed between side 19 and inclined surface 22, and is integral with wheel-engaging surface 21. It is understood that braces 27-31 are relatively flat, terminate rearwardly in the plane of edge 25, and are angled in such a manner to permit the mold members used to form said body to operate in a conventional manner.

Stabilizer bar 12 (see FIGS. 4 and 6) is essentially U-shaped, formed of rod or the like, and includes bight 32 and rearwardly extending legs 33-34; threads 35 with a nut 36 or other stop means are provided in proximity to the end of each leg. Bores 37-38 in the approximate center of faces 17-18, respectively, are of sufficient diameter to permit legs 33,34 to pass therethrough; in the retracted condition of the stabilizer bar illustrated in FIGS. 2 and 4, bight 32 butts face 14 and each leg is principally housed within the body; said bar may be extended until stopped by nut 36 bearing against the rear surface of face 14 (see FIG. 6). It is understood that legs 33,34 may be parallel and the bar 12 easily extended or retracted. Alternatively, legs 33,34 may slightly converge rearwardly; in such case, when the stabilizer bar is pulled forwardly, the said legs are forced outwardly and frictionally engage the inner sides of the respective bores thereby securing said bar in extended condition. Legs 33-34 may also diverge rearwardly; in such case, when the stabilizer bar is fully extended said legs are forced inwardly against the outer sides of the corresponding bores thereby maintaining said bar in extended condition.

As shown in FIG. 7 of the drawings, chock 10 with stabilizer bar 12 in extended condition is placed in a desired position on a supporting surface and the vehicle moved in such a direction that wheel W thereof rests upon stabilizer bar 12 and bears laterally against wheel-engaging surface 21. The weight of the vehicle on bar 12 prevents movement of said chock. As heretofore mentioned, the base of said body is provided with a conventional anti-slip surface to minimize movement of the chock on concrete or asphalt surfaces. Furthermore, wedge 24 on said body is adapted to at least partially insert into relatively soft surfaces such as dirt to minimize slipping of said chock.

Referring now to FIGS. 8 and 9, there is shown another embodiment of chock 39 constructed in accordance with the principles of the invention. Body 40, substantially similar in shape to body 11, is of solid construction and desirably of light weight metallic or reinforced plastic composition. Essentially longitudinally extending and laterally spaced bores 41-42 (bore 42 not shown) in the lower portion of said body communicate forwardly with bores 37'-38' (bore 38' not shown) heretofore mentioned; the diameter of each bore 41,42 is at least slightly greater than that of nut 36' or other stop means carried on legs 33',34'. Bar 12' may be extended until stopped by nut 36' bearing against shoulders 43-44 (shoulder 44 not shown). As heretofore mentioned, legs 33',34' are generally parallel, however, said legs may either converge or diverge rearwardly and in extended condition said legs are forced in such a direction to bear against the sides of bores 37',38' thereby maintaining said bar in extended condition.

It should be understood, of course, that the foregoing disclosure relates to only preferred embodiments of the invention and that it is intended to cover all changes and modifications of the invention herein chosen for the purposes of the disclosure which do not constitute departures from the spirit and scope of the invention.

What is claimed is:

1. A wheel chock comprising
 a body including a wheel-engaging surface,
 longitudinally extending and laterally spaced bores in said body,
 an essentially U-shaped stabilizer bar including a bight and rearwardly extending legs,
 said legs adapted to pass through the respective bores into said body,
 means in proximity to the end of each of said legs serving as forward limit stops for said bar,
 said bar adapted to be at least partially extended in operative condition, said wheel to be positioned on said bar and bear against said wheel-engaging surface to restrain movement thereof.

2. The invention of claim 1 wherein said body includes internal supports.

3. The invention of claim 1 wherein said legs are generally parallel.

4. The invention of claim 1 wherein said legs converge rearwardly and bear against the inner sides of the respective bores when said stabilizer bar is in extended condition.

5. The invention of claim 1 wherein said legs diverge rearwardly and bear against the outer sides of the respective bores when said stabilizer bar is in extended condition.

6. The invention of claim 1 wherein said body is essentially solid and includes essentially longitudinally extending and laterally spaced bores to accommodate the respective legs of said stabilizer bar.

7. The invention of claim 1 including a plurality of grooves in said wheel-engaging surface.

8. The invention of claim 1 wherein said wheel-engaging surface includes means to restrain lateral movement of a wheel supported thereon.

* * * * *